(12) United States Patent
Stekkelpak (10) Patent No.: US 9,135,303 B2
(45) Date of Patent: *Sep. 15, 2015

(54) USING PRE-SEARCH TRIGGERS

(71) Applicant: Google Inc., Mountain View, CA (US)

(72) Inventor: Zoltan Stekkelpak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,478

(22) Filed: Jun. 27, 2013

(65) Prior Publication Data

US 2015/0169693 A1    Jun. 18, 2015

Related U.S. Application Data

(63) Continuation of application No. 13/212,793, filed on Aug. 18, 2011, now Pat. No. 8,510,285.

(51) Int. Cl.
*G06F 7/00*       (2006.01)
*G06F 17/30*      (2006.01)

(52) U.S. Cl.
CPC .... *G06F 17/30522* (2013.01); *G06F 17/30861* (2013.01); *G06F 17/30864* (2013.01); *G06F 17/30867* (2013.01); *G06F 17/30876* (2013.01)

(58) Field of Classification Search
CPC ................... G06F 17/30864; G06F 17/30861; G06F 17/30867; G06F 17/30876
See application file for complete search history.

(56) References Cited

U.S. PATENT DOCUMENTS

| | | | |
|---|---|---|---|
| 7,788,248 B2 | 8/2010 | Forstall et al. | |
| 7,836,044 B2 | 11/2010 | Kamvar et al. | |
| 8,037,063 B2 * | 10/2011 | Oldham et al. | 707/723 |
| 8,051,071 B2 * | 11/2011 | Dean et al. | 707/722 |
| 8,417,263 B2 | 4/2013 | Jenkins et al. | |
| 8,510,285 B1 | 8/2013 | Stekkelpak | |
| 2002/0120609 A1 * | 8/2002 | Lang et al. | 707/1 |
| 2005/0004889 A1 | 1/2005 | Bailey et al. | |
| 2007/0061195 A1 | 3/2007 | Liu et al. | |
| 2007/0260596 A1 | 11/2007 | Koran et al. | |
| 2008/0005068 A1 | 1/2008 | Dumais | |
| 2009/0164516 A1 | 6/2009 | Svendsen et al. | |
| 2010/0138421 A1 * | 6/2010 | Oldham et al. | 707/737 |
| 2011/0047120 A1 | 2/2011 | Kamvar et al. | |

(Continued)

OTHER PUBLICATIONS

Office Action issued in U.S. Appl. No. 13/212,793 on Oct. 26, 2012, 10 pages.

(Continued)

*Primary Examiner* — Loan T Nguyen
(74) *Attorney, Agent, or Firm* — Fish & Richardson P.C.

(57) ABSTRACT

Methods, systems, and apparatus, including computer programs encoded on a computer storage medium, for using pre-search triggers. In one aspect, a method includes identifying one or more topics and determining that a confidence score associated with a particular topic of the one or more identified topics satisfies a predetermined threshold value. An occurrence of a pre-search trigger can be detected. In response to determining that the confidence score associated with the particular topic satisfies the predetermined threshold value and detecting the occurrence of the pre-search trigger, a search engine can be instructed to execute a search using a search query associated with the particular topic. A representation of a resource identified in results received in response to the search can be provided.

25 Claims, 4 Drawing Sheets

(56) References Cited

U.S. PATENT DOCUMENTS

2011/0066717 A1    3/2011   Ahola
2011/0087686 A1    4/2011   Brewer et al.
2012/0233178 A1*   9/2012   Oztekin et al. ................ 707/748
2013/0204868 A1*   8/2013   Singh ............................ 707/724

OTHER PUBLICATIONS

Notice of Allowance issued in U.S. Appl. No. 13/212,793 on Apr. 3, 2013, 9 pages.

* cited by examiner

USING PRE-SEARCH TRIGGERS

CROSS-REFERENCE TO RELATED
APPLICATION

This application is a continuation of and claims priority from U.S. patent application Ser. No. 13/212,793, filed on Aug. 18, 2011. The contents of U.S. patent application Ser. No. 13/212,793 are incorporated herein by reference in their entirety.

BACKGROUND

The present specification relates to information retrieval.

Internet search engines identify resources (e.g., web pages, images, text documents, multimedia content) that are relevant to a user's information needs, and present information about the resources in a manner that is useful to the user. Typically, users submit queries that suggest the information the users want to retrieve, and search engines provide search results that are responsive to the queries.

SUMMARY

A search engine system can perform a search and can provide information to a user before the user submits a search query, for example in response to detecting a pre-search trigger. The search engine system predicts a topic likely to be of interest to the user. When the search engine system detects a pre-search trigger and determines that a confidence score for the predicted topic is above a threshold, the search engine identifies a resource related to the topic by causing a search to be performed. The search engine system then provides a representation of the identified resource to the user.

One innovative aspect of the subject matter described in this specification is embodied in methods that include the actions of: identifying one or more topics; determining that a confidence score associated with a particular topic of the one or more identified topics satisfies a predetermined threshold value; detecting an occurrence of a pre-search trigger; instructing a search engine to execute a search using a search query associated with the particular topic in response to (i) determining that the confidence score associated with the particular topic satisfies the predetermined threshold value, and (ii) detecting the occurrence of the pre-search trigger; and providing a representation of a resource identified in results received in response to the search.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, the pre-search trigger occurs before the user enters a query term. Detecting the occurrence of the pre-search trigger includes receiving information indicating that a control on a user interface of a client device has been selected. Detecting the occurrence of the pre-search trigger includes receiving a request to provide a resource. Providing a representation of the resource includes causing navigation to be redirected to the selected resource. Providing a representation of the resource includes providing a resource that, when rendered, causes content of the selected resource to be displayed on a portion of a user interface. Providing a representation of the resource includes providing a resource including a link to the selected resource. The confidence score is based on a browsing history of a user or a search query history of a user. The identifying, determining, detecting, instructing, and providing are performed by a server system. The identifying, determining, detecting, instructing, and providing are performed by a client computing device. Identifying one or more topics includes selecting a topic from a predetermined set of topics. Identifying one or more topics includes generating a topic based on based on a browsing history of a user or a search query history of a user.

Advantageous implementations can include one or more of the following features. A user can receive information by performing few or no actions. Information can be provided to a user in response to a pre-search trigger. Information can be provided to a user before a search query is submitted. Delays in providing information to a computing device can be avoided. Predicted content can provided quickly to a computing device.

The details of one or more embodiments are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
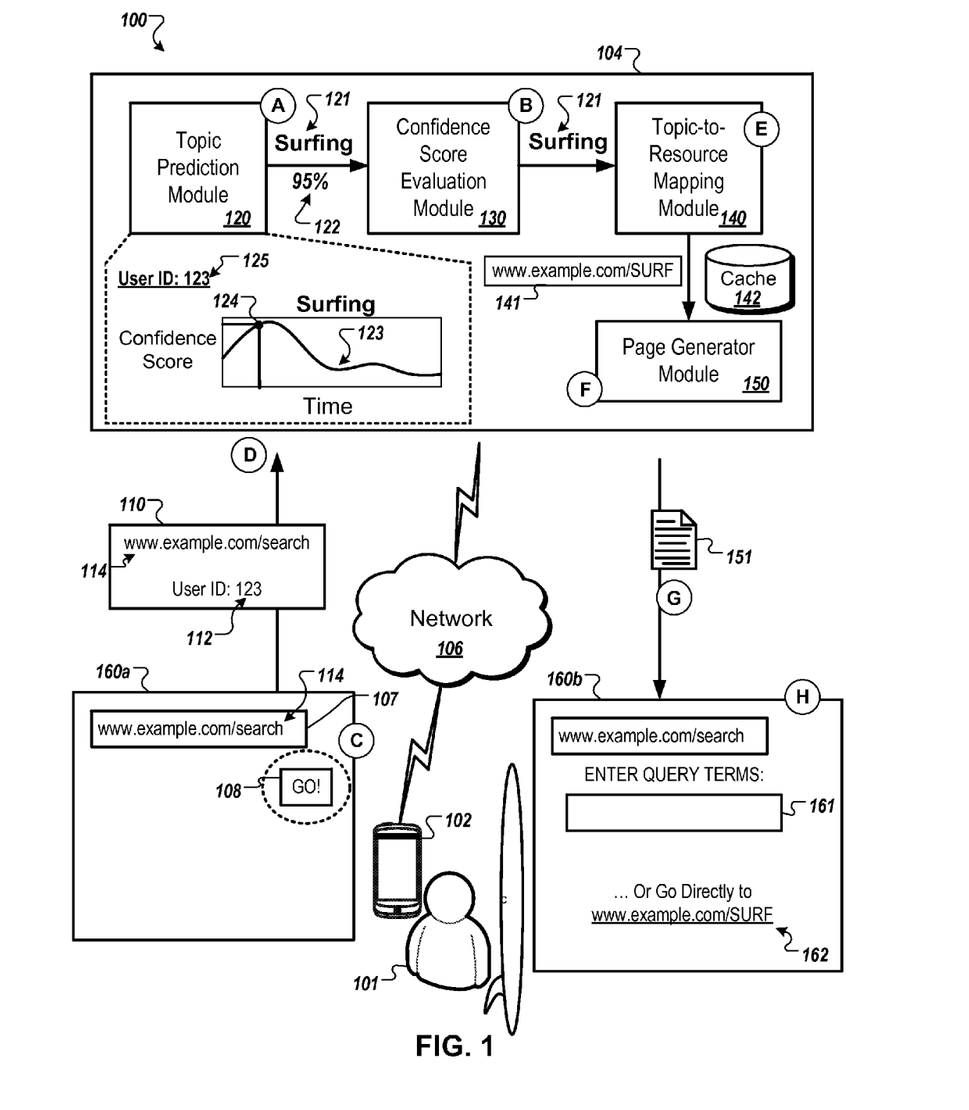
FIG. 1 is a diagram of an example of a system that can provide information in response to a pre-search trigger.

FIG. 1 is a diagram of an example of a system 100 that can provide information in response to a pre-search trigger. The system 100 includes a client device 102, a server system 104, and a network 106. The client device 102 can be, for example, a desktop computer, laptop computer, cellular phone, smart phone, tablet computer, a music player, an e-book reader, or navigation system. The functions performed by the server system 104 can be performed by individual computer systems or can be distributed across multiple computer systems.

A search engine system can enhance a user's experience by providing information about a topic of interest to the user before the user initiates a search or enters a search query. The search engine system identifies a topic, for example, "movies," "baseball," or "fishing in Colorado." Using information about a particular user, the search engine system generates a confidence score indicating a likelihood that the identified topic will be of interest to the particular user. The search engine system predicts that the topic is likely of interest to the user when the confidence score satisfies a threshold. The search engine system may identify multiple topics, and can simultaneously provide content for multiple topics satisfying the threshold or provide content for a topic assigned the highest confidence score.

A user can access a search engine interface, for example, by navigating to a web page providing an interface to the search engine. Data indicating this access to the search engine interface is a pre-search trigger, which is detected by the search engine system. The search engine determines that the pre-search trigger is associated with the user. In response to the pre-search trigger, the search engine system performs a search to select a resource associated with the topic predicted to be of interest to the user. The search engine system then provides a representation of the selected resource to the user.

For example, the search engine can provide search results that include a link to a web page that, when rendered, causes content of the selected resource to be displayed, or causes a link to the selected resource to be displayed. Because the selected resource is identified based on the predicted topic rather than a search query entered by the user, information related to the topic can be provided to the user before the user enters a search query. When the server system does not identify a topic having a confidence score above the threshold, a representation of a resource selected based on a predicted topic is not provided. A representation of a resource can include, for example, a link, a snippet, a summary, an excerpt, a portion of an interface, a snapshot, and so on. In some implementations, the form of the representation can be determined based on the confidence score or other signals used to assign the confidence score.

The server system 104 can include a topic prediction module 120, a confidence score evaluation module 130, a topic-to-resource mapping module 140, and a page generation module 150, described in further detail below. The network 110 can be wired or wireless or a combination of both and can include the Internet. The diagram shows states (A) to (G), which may occur in the sequence illustrated or in a different sequence. States (A) to (C) and (E) to (G) illustrate a flow of data, and states (D) and (H) illustrate user interfaces 150a, 150b.

During state (A), the server system 104 identifies one or more topics. The identified topics can be a general set of topics or topics that are predicted to be of interest to a particular user 101. For each identified topic, the server system 104 generates a confidence score indicating a likelihood that the corresponding topic is of interest to the user 101 at the current time.

In the illustrated example, the topic prediction module 120 identifies a topic 121, "surfing." The topic prediction module 120 also generates a confidence score 122 of 95%, which indicates a predicted likelihood that the user 101 would be interested in viewing or receiving content related to the topic 121. As used herein, content is defined broadly to include an interactive interface, for example, an e-mail interface or on-line banking interface. Thus a user's interest can include an interest in performing a particular action through an interactive interface, in addition to consuming media or receiving non-interactive information.

Topics can be categories of information, whether broad or narrow, for example, "sports," "bagpipes," "kayaking," etc. Topics can be selected from a predefined set of topics or can be dynamically generated by the server system 104. A topic can include multiple components, for example, "kayaking in California." Examples of topics also include a search query composed of one or more terms, a category of web pages, or a particular resource. Topics can be search queries submitted by the user 101 or by other users.

The topic prediction module 120 of the server system 104 can identify topics from a collection of predefined topics or can generate new topics. The topic prediction module 120 can use information about the user 101 to identify topics. The information can include, for example, demographic information, location information, an Internet browsing history, and a search query history of the user 101. For example, the topic prediction module 120 can compose a topic using keywords and other aspects of a browsing history or search history of the user 101. The topic prediction module can also select topics based on the device type of the client device 102, applications on the client device 102, the location of the user or the client device 102, user-defined indicated topics or topics expressly indicated by the user 101, social connections, and external factors. These signals, described in further detail below, can be used to identify topics and to generate confidence scores for identified topics.

The topic prediction module 120 can identify topics based on a device type of the client device 102, for example, whether the client device 102 is a smartphone, tablet computer, laptop computer, or desktop computer. The topic prediction module 120 can infer a range of likely information needs of the user 101 based on the device type, and thus filter the topics likely to be of interest to the user 101.

In a similar manner, the topic prediction module 120 can also access information about applications installed on or currently running on the client device 102. The topic prediction module 120 can identify applications on the client device 102 and access a database indicating topics associated with the identified applications. The topic prediction module 120 can consider topics associated with an identified application to be more likely to be of interest to the user 101.

The topic prediction module 120 can also use the location of the client device 102 to infer likely information needs of the user 101 and to select corresponding topics. To identify a location or type of location where the client device 102 is located, the topic prediction module 120 can compare the current location of the client device 102 with known locations of significance to the user, for example, a home location, a workplace location, and frequently visited locations, or with standard maps or location databases. If the client device 102 is determined to be located at the workplace of the user 101, for example, topics related to office productivity and the profession of the user 101, if known, can be selected. By contrast, topics related to entertainment can be selected if the client device 102 is determined to be located at the user's home. If the client device 102 is determined to be located on a road, the topic prediction module 120 can select topics related to maps, navigational directions, or local attractions. In a similar manner, appropriate topics can be selected if the client device 102 is determined to be located at a school, theater, beach, or other location.

Topics can also be selected based on a user's social connections. For example, the topic prediction module 120 can access information about the user's social connections from, for example, a social networking service, an e-mail contacts list, an employment web page, or other sources. Topics that are indicated to be of interest to the social connections of the user 101 can be selected, as they are also likely to be of interest to the user 101.

Additionally, external factors such as environmental conditions, such as the weather, temperature, season of the year, and time of day can be used to select topics. For example, outdoor activities may be more likely to be of interest when sunny rather than raining, in summer rather than winter, and during the day rather than at night. The physical or environmental context of the client device 102 can be used to select topics. For example, if the client device 102 is determined to be docked in a vehicle, the location of refueling stations may be selected as a topic of interest, especially if data is available indicating that the vehicle is determined to be low on fuel. The topic prediction module 120 can identify other events or conditions, such as news releases or stock price movements, that may cause a topic to become of interest to the user 101.

Information about the user 101, such as an Internet browsing history and search query history, can be associated with an identifier 125 for the user 101, such as a user account for the user 101 or a cookie stored on the client device 102 of the user 101. The topic prediction module 120 can identify topics that the user 101 is likely to be interested in, for example, topics related to or corresponding to previous search queries of the user 101.

The topic prediction module 120 uses information about the user 101 and the client device 102 to generate confidence scores for the identified topics. The topic prediction module 120 can use any of the information used to select a topic to generate a confidence score. The confidence score for each topic is generated based on, for example, the degree that the topic matches information about the user 101. The higher the correlation between a topic and information about the user 101, the higher the confidence score for the topic.

The confidence score 122 can represent a level of interest in the topic 121 corresponding to a particular time. Even though the user 101 may always have a general interest in the topic 121, the user 101 may be likely to view or request information about the topic at particular times. Thus the confidence score 122 for a topic 121 can be time-dependent, indicating that the interest of the user 101 in receiving information about the topic 121 is a function of time. At different times through the day, and from one day to another, the value of the confidence score 122 for the topic 121 changes for the user 101, even when the information about the user 101 does not change. For a given time, the confidence score 122 for the topic 121 can indicate a degree of correlation between the topic and actions of the user 101 at similar times. Information about the user 101 can indicate patterns of behavior of the user 101, which the topic prediction module 120 can use to generate time-dependent confidence scores.

As an example, information about the user 101 can indicate that the user 101 usually searches for information about surfing in the morning on weekends. A curve 123 illustrates an example relationship between the confidence score 122 and the topic 121 over the course of a day. The curve 123 is illustrated as an example, and the topic prediction module 120 need not generate confidence scores for any range of time or generate confidence scores as a continuous function. The curve 123 indicates that the topic is highly correlated with actions of the user 101 during mornings, and less correlated with actions of the user 101 during afternoons. A point 124 on the curve 123 represents the confidence score 122 of 95% for the topic 121 at the current time.

During state (B), the server system 104 determines whether the confidence score for each of the one or more identified topics satisfies a threshold. For example, the confidence score evaluation module 130 determines that the confidence score 122 of 95% exceeds a minimum threshold of 90%. This indicates that there is a high likelihood that the user 101 is interested in viewing content related to the topic 121 at the current time. In some implementations, the confidence score evaluation module 130 determines whether each confidence scores satisfies one or more of multiple thresholds, which can each represent a different level of interest. Topics that satisfy at least one threshold can be made accessible to the topic-to-resource module 130.

To reduce the likelihood of presenting information that is not useful to a user, the server system 104 can use a high minimum threshold, for example, a minimum threshold of about 70% or higher. Using a high minimum threshold can also conserve network bandwidth by avoiding transfer of information not useful to a user. When a user has browsed or searched for information about a topic irregularly or infrequently, a low confidence score, for example, 40%, may be generated. The low confidence score indicates significant uncertainty that the user will find information about the topic to be useful at a particular time. By contrast, when the user has regularly and frequently requested information about a topic, or otherwise accesses information about the topic with a predictable pattern, a high confidence score, for example, 80%, can be generated. The high confidence score indicates that, for a particular time, the user is very likely to find information about the topic useful.

In some implementations, the server system 104 uses a user-specific confidence threshold for each user. The server system 104 can adjust the threshold for a particular user based on the behavior of the user. For example, the server system 104 can set a high confidence threshold for a user with a browsing history indicating a narrow or consistent range of topics. The server system 104 can set a lower threshold for a user that browses web pages associated with many topics, or if a browsing history indicates that topics of interest change frequently. Users having similar browsing patterns can be assigned similar confidence thresholds.

In addition, the confidence threshold can be adjusted based on the user's interaction with content provided by the server system 104. For example, the server system 104 may determine that a user sometimes clicks on content presented by the server system 104 when the confidence score for an associated topic is above a particular value, for example, 70%, but that the user does not click on content associated with topics assigned lower confidence scores. As a result, the server system 104 may set the confidence threshold for the user at 70%, corresponding to the minimum confidence level eliciting any user interaction. The server system 104 can alternatively set the confidence threshold at a level corresponding to a particular level or frequency of user interaction.

In some implementations, the server system 104 repeats states (A) and (B). Over time, the server system 104 can periodically predict topics that, for the current time or a particular time range, have confidence scores exceeding a threshold. Thus before receiving a request to execute a search, the server system 104 can have already identified topics the user 101 is currently likely to be interested in. In the same manner that topics of interest are identified for the user 101, the server system 104 can also identify topics predicted to be of interest to other users.

During state (C), using the client device 102, the user 101 performs an action that generates a pre-search trigger. A predetermined set of actions or conditions can be designated as suggestive of a user's intent to initiate a search. The pre-search trigger can be data that indicates that an action or condition in the set has occurred. For example, the pre-search trigger can be data that indicates a user action to initiate a dialogue with a search engine. Examples of such actions include initiating navigation to a web page for a search engine, causing a search toolbar to be displayed, or speaking a voice command signaling that a search will follow. As another example, the user 101 can select a control for receiving a query term, for example, by clicking in a text field in which query terms can be entered. Data indicating any of these actions can be a pre-search trigger, which can be detected in state (D) below.

In the illustrated example, the user 101 initiates navigation to a web page for a search engine. The user interface 150a displays the user interface for a web browser, including an address bar 107 for receiving a URL. The user 101 initiates navigation to a search engine web page 114, accessible at the URL "www.example.com/SEARCH." The user 101 selects a control 108 on the user interface 150a and the client device 102 transmits a request 110, for example, an HTTP request or SPDY request, to retrieve the web page 114. The request includes an identifier 112 or other information identifying the user 101. The identifier 112 can be, for example, a username of a user account or information stored in a cookie on the client device 102.

In some implementations, the client device 102 also transmits to the server system 104 a request to retrieve a resource in response to actions other than initiating navigation. For example, in response to a mouse click in a text field for receiving a query term, the client device 102 can transmit information indicating that the mouse click occurred. The information can be a request to retrieve a resource, and the request can indicate that a search is predicted to occur, even when no text is entered in the field.

In some implementations, different pre-search triggers can be defined for different types of client devices. For example, for a phone, a pre-search trigger can be data indicating an acceleration level that indicates that a user has picked up the phone. For a tablet computer, the pre-search trigger can be data indicating that the user touched a touchscreen, or data indicating that the tablet computer has recently emerged from a low-power state. Other examples of pre-search triggers can include, for example, data indicating that a browser has been launched and data indicating that a cursor of a pointing device is approaching a search toolbar or a desktop icon for a search engine. Data indicating that a user is approaching the client device 102, for example, sound from a microphone or video from a camera, can also be a pre-search trigger.

During state (D), the server system 104 detects the pre-search trigger and identifies the user 101 associated with the pre-search trigger. In the example, the server system 104 receives the request 110 and identifies the request 110 as a pre-search trigger. The server system 104 also determines that the pre-search trigger is associated with the user 101, for example, by determining that the identifier 112 matches the identifier 125.

As described above, a pre-search trigger is data indicating that one or more actions or conditions in a predetermined set have occurred. The predetermined set of actions or conditions can include actions or conditions that enable a user to initiate a dialogue with a search engine. The pre-search trigger can thus indicate that a search is likely to be subsequently requested, before a search is actually requested. Nevertheless, a pre-search trigger does not require a subsequent search request or subsequent input of query terms. For example, after navigating to the web page 114, the user 101 may navigate to a different page without actually entering or submitting a search query.

A pre-search trigger can indicate a state in which a user can immediately enter a query term, for example, the placement of a text cursor in a query-receiving field. As another example, a pre-search trigger can indicate a state in which a user can enter a query term after performing a single action, such as selecting a control that is displayed on a user interface or will be rendered after a resource is received. A pre-search trigger can indicate an action of the user 101 to access to a search interface, for example: initiating navigation to a resource that, when rendered, provides a search interface; causing a search toolbar or search interface to be displayed; and clicking on a text field for receiving a query term.

The pre-search trigger can occur before query terms for a search are entered, selected, or otherwise specified. Thus the pre-search trigger can occur before any query term for the search—even a single character—is received by the server system 104 or is entered on the client device 102.

To detect the pre-search trigger, the server system 104 can receive data from the client device 102 or access data from another source, such as another server system. The pre-search trigger can be, for example, a request to provide a resource, a notification of an event, or information indicating a state of the client device 102. To determine whether accessed data includes a pre-search trigger, the server system 104 can determine whether the accessed data indicates one or more of a set of predetermined actions or conditions enabling a user to initiate a dialogue with a search engine system.

During state (E), the server system 104 selects a resource related to the topic 121 predicted to be of interest to the user 101. The topic 121 is predicted to be of interest to the user 101 at the time of the pre-search trigger. For example, confidence score 122 can correspond to substantially the same time as the request 110, or can fall within a range of time, e.g., five minutes or one hour, from the time of the request 110. Because the confidence score 122 for the topic 121 satisfies the threshold, and because the pre-search trigger is detected, the server system 104 selects a resource related to the topic 121. If multiple topics have confidence scores that satisfy the threshold, the server system 104 can select a resource related to each of the multiple topics.

To select a resource, the topic-to-resource mapping module 140 can, for example, instruct a search engine to execute a search using a search query associated with the topic 121. The topic-to-resource mapping module 140 can access a stored query for the topic 121 or can generate a query for a topic 121. The topic-to-resource mapping module 140 can select a resource identified in results to the search returned by the search engine. A topic can indicate a particular media type, and the topic-to-resource mapping module 140 can cause the search engine to return results corresponding to resources of the indicated media type, for example, web page, image, video, or music. In some implementations, to select a resource for a topic, the topic-to-resource mapping module 140 can select a resource having a predetermined mapping to a particular topic.

In the example, the request 110 for the search engine web page 114 indicates that, at the current time, the user 101 likely intends to search for and view as-yet unspecified information. Because the user 101 has not entered any query terms for a search, the particular topic for which the user 101 desires to retrieve content cannot be discerned from the request 110.

Nevertheless, by periodically predicting topics of interest to the user 101, the server system 104 has identified a topic 121 that is likely to be of interest to the user 101 at the current time. For the topic 121, the topic-to-resource mapping module 140 causes a search to be performed with a query term "surfing." From results received in response to the search, the topic-to-resource mapping module 140 selects the resource corresponding to the top-ranking result, a resource 141 accessible at Uniform Resource Locator (URL) of "www.example.com/SURF."

During state (F), the server system 102 generates information to provide to the client device 102. The server system 104 can generate a search result or search results page that includes a representation of the resource 141.

In the example, the page generator module 150 generates a resource 151 that, when rendered on the client device 102, causes a search engine web page and a link to the resource 141 to be displayed. The resource 151 is thus customized for the user 101 so that, when rendered, content related to the topic 121 is displayed. The page generator module 150 can access content of a resource 141 from a cache 142 to provide the content to the user 101 with a minimal delay.

A representation of a resource can include one or more of, for example, a link to a resource, a portion of content of the resource, or the entire resource. A representation of a resource can include code that causes the resource to be retrieved and rendered, for example, in an inline frame ("iFrame") or other display area. In some implementations, a representation of the resource 141 can be provided by causing navigation to be redirected to the resource 141.

In some implementations, the server system 104 selects the representation of the resource 141 based on the confidence score 122. For example, the server system 104 can select a different representation for the resource 141 when the confidence score 122 satisfies different thresholds. For example, if the confidence score 122 exceeds a high threshold, the resource 141 can be displayed in a search engine web page, for example, in an iFrame or through any other manner of displaying content within a web page. If the confidence score 122 exceeds a low threshold but not the high threshold, a link to the resource 141 can be provided.

If the server system 104 does not identify a topic having a confidence score that satisfies the threshold, then no representation of a resource is provided. The page generator module 150 can respond to the pre-search trigger by providing a search engine web page, without topical customization. For some pre-search triggers, such as selection of a text field for entering a query, the server system 104 can ignore the pre-search trigger when no topic has a confidence score determined to satisfy a threshold.

During state (G), the server system 104 transmits the resource 151 to the client device 102 in response to the request 110.

As an alternative, as described below, one or more actions illustrated as performed by the server system 104 can be performed by the client device 102. In such implementations, the client device 102 need not receive a resource from the server system 104. For example, the client device 102 may generate a user interface that includes a link to the resource 141.

During state (H), the client device 102 displays the rendered resource 151 on the user interface 160b. The user interface 160b displays a search engine interface including, for example, a control 161 for receiving a query term. The user interface 160b also displays a link 162 to the resource 141.

Through the link to the resource 141, the user 101 can quickly access the resource 141 and gain information about the topic 121. The user 101 can select the link 162 to navigate directly to the resource 141, whereas the user 101 would traditionally select the control 161, enter a search query, select a control to submit the search query, receive a search engine results page, and select a link for the resource 141 from a search engine results page. In addition to, or as an alternative to, display of a link 162, content of the resource 141 can be provided immediately with the search engine interface. Thus the user 101 can quickly access information related to the topic 121.

Additionally, information is not provided for topics that are not determined to have confidence scores satisfying the threshold. As a result, the search interface is supplemented with additional information for topics determined to be of interest to the user, and information related to topics not determined to be of interest to the user is excluded.

Figure 4:
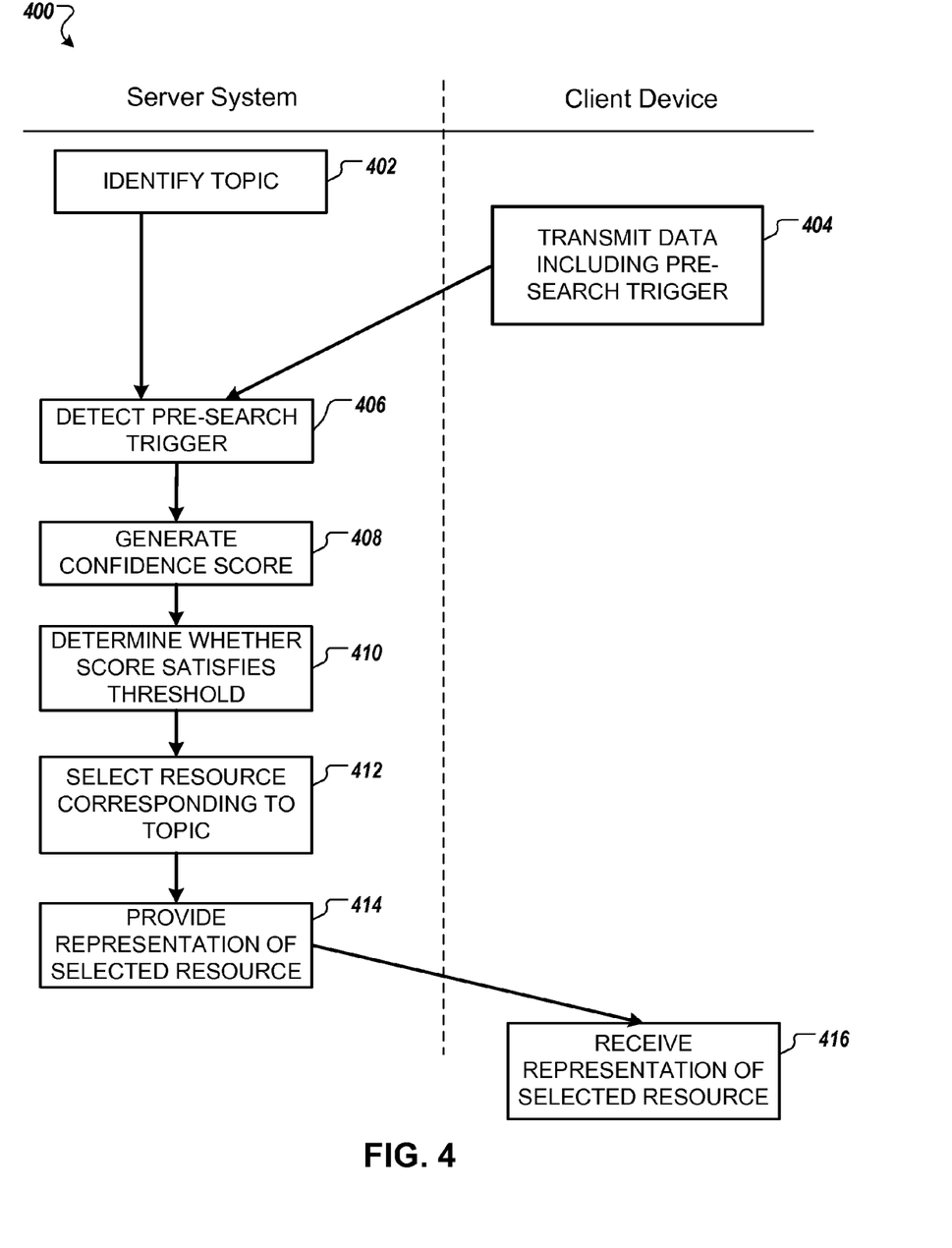
FIG. 4 is a swim lane diagram illustrating an alternative sequence for a process for providing information in response to a pre-search trigger.

In some implementations, the actions described for states (A) to (H) can be performed in a different sequence, for example, as illustrated in FIG. 4. As another example, selecting a resource related to a topic, as described for state (E), can be performed before detecting a pre-search trigger. Thus when the server system 104 detects the pre-search trigger in state (D), the server system 104 can previously have selected a resource 141 corresponding to the topic 121, permitting the server system 104 to quickly provide a representation of the resource 121 to the user in response to detecting the pre-search trigger.

In some implementations, the actions described for states (A) to (H) can be performed by the client device 102, for example, by downloaded code or by a browser or other application running on the client device 102. For example, the client device 102 can identify one or more topics, generate or access confidence scores for the identified topics, and determine whether the confidence scores satisfy one or more thresholds. When a topic is determined to satisfy a threshold, the client device 102 can select a corresponding resource and display a representation of the resource.

Figure 2:
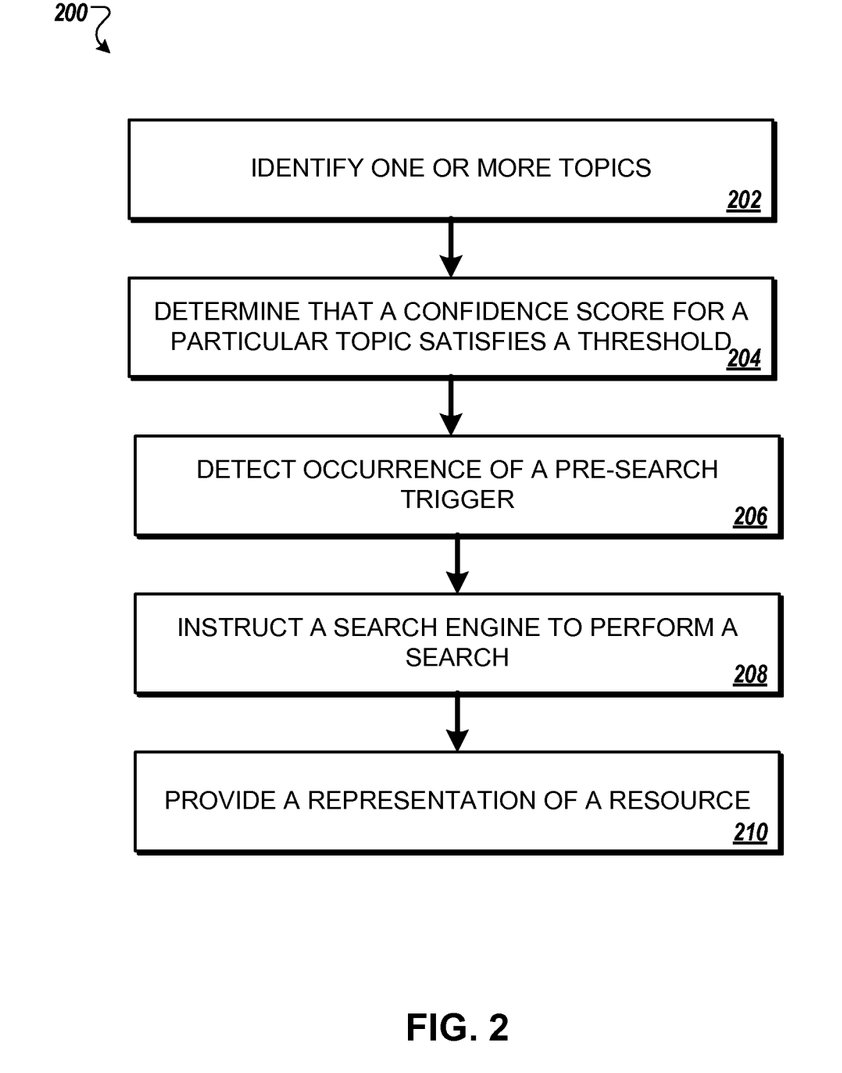
FIG. 2 is a flow chart illustrating an example of a process for providing information in response to a pre-search trigger.

FIG. 2 is a flow chart illustrating an example of a process 200 for providing information in response to a pre-search trigger. Briefly, the process 200 includes identifying one or more topics, determining that a confidence score associated with a particular topic of the one or more identified topics satisfies a predetermined threshold value, and detecting an occurrence of a pre-search trigger. The process 200 also includes instructing a search engine to execute a search using a search query associated with the particular topic in response to (i) determining that the confidence score associated with the particular topic satisfies the predetermined threshold value, and (ii) detecting the occurrence of the pre-search trigger, and providing a representation of a resource identified in results received in response to the search.

One or more topics are identified (202). The topics can be selected from a predefined hierarchy of topics. The topics can be identified based on information about a particular user based on a browsing history of the user and a search query history of the user.

A confidence score associated with a particular topic of the one or more identified topics is determined to satisfy a predetermined threshold value (204). The confidence score can be determined for the particular user based on a browsing history of the user and a search query history of the user. The confidence score can indicate a degree of correlation between the particular topic and actions of the user.

When confidence scores for multiple topics satisfy the predetermined threshold value, the topic with the highest confidence score can be selected. As an alternative, the N topics with the highest confidence scores can be selected, where N is a predetermined integer. In some implementations, each topic that has a confidence score that satisfies the threshold can be selected. As described below, for each topic selected, a corresponding resource can be identified, and a representation of the identified resources can be provided in response to detecting a pre-search trigger.

An occurrence of a pre-search trigger is determined (206). The pre-search trigger can be determined to be associated with the particular user for which the confidence score is determined to satisfy the threshold value. The pre-search trigger can be an action to initiate a dialogue with a search engine. For example, the pre-search trigger can be data indicating an action to gain access to a search engine interface, such as an interface or control for receiving a query term. The pre-search trigger can occur during a browsing session before a query term is entered.

Detecting the occurrence of the pre-search trigger can include receiving information indicating that a control on a user interface of a client device has been selected. Detecting the occurrence of the pre-search trigger can include receiving a request to provide a resource that provides a search interface.

A search engine is instructed to execute a search using a search query associated with the particular topic (208). The search is executed in response to (i) determining that the confidence score associated with the particular topic satisfies the predetermined threshold value and (ii) detecting the occurrence of the pre-search trigger.

A representation of a resource identified in results received in response to the search is provided (210). The resource can be a resource referenced by the top-ranking result of the results received in response to the search. The representation of the resource can be provided such that it is displayed with a search engine interface.

Providing a representation of the resource can include causing navigation to be redirected to the resource. Providing a representation of the resource can include providing a resource that, when rendered, causes content of the selected resource to be displayed on a portion of a user interface, for example, in a frame or an iFrame of a search engine web page. Providing a representation of the resource can include providing a resource including a link to the selected resource.

Figure 3A:
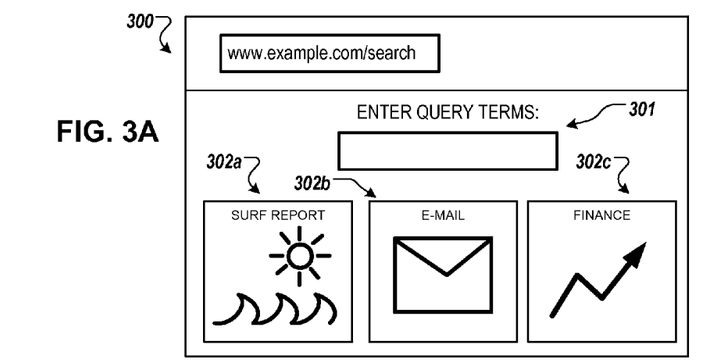
FIGS. 3A, 3B, and 3C are examples of user interfaces that illustrate search engine home pages that include representations of resources.

FIG. 3A is an example of a user interface 300 that illustrates a search engine home page that includes a representation of a resource. The search engine home page includes three images 302a-302c that represent different resources, which correspond to topics that are predicted to be of interest to the user. Multiple topics can be selected when each of the multiple topics has a confidence score that satisfies an appropriate threshold. If many topics have confidence scores that satisfy the threshold, a predetermined number of topics having the highest confidence scores, for example, the topics assigned the top three confidence scores, can be selected. In response to a pre-search trigger, a representation of a resource corresponding to each selected topic can be displayed.

The user interface 300 displays a search interface 301 and the images 302a-302c. The images 302a-302c represent three different resources, each corresponding to one of three different topics, "surf report," "e-mail," and "finance." The images 302a-302c displayed can be rendered from image files referenced by each resource, for example, images that would be displayed if the corresponding resource were rendered. Alternatively, the images 302a-302c can be "snapshot" images displaying a rendered representation of a portion of or all of the respective resources. As another alternative, the images 302a-302c can each be icons or symbols representing the respective resources or the topics corresponding to the resources.

In some implementations, multiple alternatives can be presented to the user to provide a sense of choice. For example, when a representation of an associated resource is presented, representations of other resources for the same topic or representations of resources associated with different topics can also be presented. Representations of alternative resources can be presented as links, snippets, layers, lists, images, icons, and so on. For example, when a server system can predict a product of interest and a user's preferred retailer, representations of resources offering the product can be provided, both from the preferred retailer and other retailers. The information about alternative retailers can provide welcome choices to the user and may allay suspicions that the prediction algorithm is attempting to sway the user's behavior.

Figure 3B:
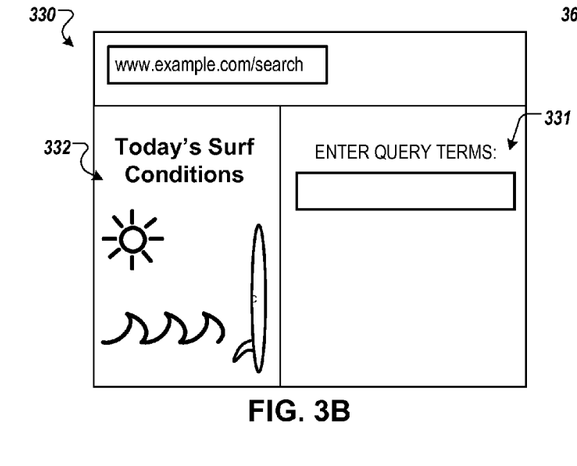

FIG. 3B is an example of a user interface 330 that illustrates a search engine home page that includes a representation of a resource. The user interface 330 displays a search engine interface 331 and a rendering 332 of a resource that corresponds to a predicted topic for the user. After a pre-search trigger is detected, a web page can be provided that causes portions of or all of a resource corresponding to a predicted topic to be rendered. Content of a resource can be presented in an iFrame, or can be displayed in any other manner of displaying content in a web page. The rendering 332 can be displayed at, for example, the side, top, bottom, or other location of the user interface 330.

The content of the rendering 332 can include one or more types of media, for example, a web page, a video, an audio recording, an image, an animation, or an embedded application. In some implementations, a server system selects the resource for a particular type of media based on information about the user. For example, if the user searched for images during the previous browsing session, the resource provided can be an image.

Figure 3C:
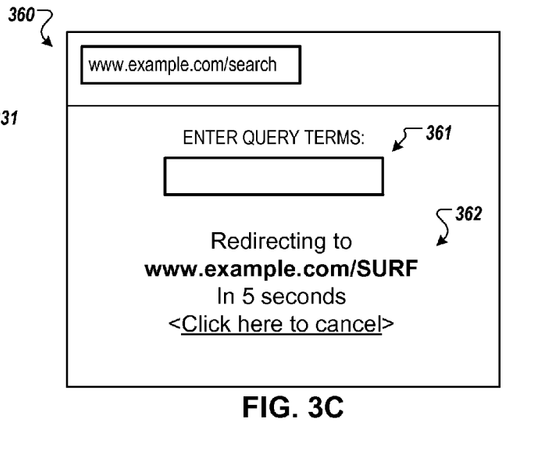

FIG. 3C is an example of a user interface 360 that illustrates a search engine home page that includes a representation of a resource. A resource rendered by a client device can cause navigation to be redirected to a different resource, for example, a resource corresponding to a topic predicted to be of interest to the user. When a user navigates to the search engine home page, for example, the server system providing the search engine home page can detect a pre-search trigger. The search engine home page provided to the user can redirect navigation to a resource that corresponds to a topic predicted to be of interest to the user.

In the example, the search engine home page is rendered at a client device, causing a search interface 361 and a redirection notice 362 to be displayed. The search engine home page is personalized for the user and causes navigation to "www.example.com/SURF", which corresponds to the topic predicted to be of interest to the user. The redirection notice 362 indicates that redirection will occur in a particular period of time, for example, in five seconds. As an alternative to delayed redirection, a search engine home page or other received resource can cause the user's browser to immediately navigate to the resource that corresponds to the predicted topic.

As another example, information about a user can indicate that, on weekdays between 9:00 am and 10:00 am, the user frequently enters a search for a particular e-mail web page. Using this information, a server system can identify the particular e-mail web page as a topic of interest for this range of time, and determine that a confidence score for the topic satisfies a threshold. When the user navigates to the search engine web page on a weekday between 9:00 am and 10:00 am, the server system can detect a request for the search engine web page as a pre-search trigger. In response, the server system can provide a resource that, when rendered, redirects the user's web browser to the e-mail site. As a result, the user receives access to the content of the e-mail site without entering a search query and reviewing search results.

In some implementations, a server system selects the type of representation to provide based on the confidence score for a topic predicted to be of interest to the user. For example, various ranges of confidence can correspond to, from highest confidence to lowest confidence, the server system: (i) causing immediate navigation to the selected resource; (ii) causing navigation to the selected resource after a time delay; (iii) providing a resource which causes content of the selected resource to be displayed; (iv) and providing a resource including a link to the selected resource. The confidence ranges for the presentation modes can respectively be, for example: (i) 90% and higher; (ii) 80% to 90%; (iii) 70% to 80%; and (iv) 60% to 70%. The higher the confidence score for the topic, the greater degree of content of the selected resource is provided.

In some implementations, a resource can be selected to provide an appropriate level of information based on the confidence score for the topic. For example, a topic may be purchasing a dishwashing machine from a particular retailer. If the confidence score for the topic is high, the resource selected can be a web page from the retailer providing details of a particular product for sale. If the confidence score is medium, the resource selected can be a web page for the kitchen appliances department of the retailer. If the confidence score is low, the resource selected can be the main page for the retailer.

In some implementations, the server system 104 selects the type of representation to provide based on the confidence score for a topic predicted to be of interest to the user. The higher the confidence score for the topic, for example, the greater degree of content of the selected resource is provided. For example, various ranges of confidence scores can correspond to, from highest confidence to lowest confidence, the server system 104 providing a resource: (i) causing immediate navigation to the selected resource; (ii) causing navigation to the selected resource after a time delay; (iii) providing content of the selected resource to be displayed, for example, with a search engine interface; and (iv) providing a link to the selected resource.

FIG. 4 is a swim lane diagram illustrating an alternative sequence for a process 400 for providing information in response to a pre-search trigger. By contrast with the sequence of FIG. 1, the process 400 includes generating a confidence score and determining whether the confidence score satisfies a threshold after detecting the pre-search trigger rather than before.

In the process 400, the server system identifies a topic (406), for example predicting a topic likely to be of interest to a user at a particular time based on behavior patterns of the user. The server system can update predictions as new information about the behavior of the user is received, and can predict topics regardless of whether the user is currently in communication with the server system. For example, the server system can predict topics for a user even when the user has not yet initiated a search session or has logged in to a user account.

The client device transmits information indicating a pre-search trigger has occurred (404), and the server system detects a pre-search trigger (406). In response to the pre-search trigger, the server system generates a confidence score (408), and determines whether the confidence score satisfies a threshold (410). In the process 400, the server system select a resource corresponding to topic (412), provides a representation of the selected resource to the client device (414), and the representation of the selected resource is received by the client device (416).

A number of variations can be implemented. For example, the server system can also generate the confidence score (408) and/or select a resource corresponding to topic (412) before detecting the pre-search trigger (406). As another example, the server system can generate the confidence score (408), determine whether the confidence score satisfies a threshold (410), and select a resource corresponding to topic (412) before detecting the pre-search trigger (406).

In some implementations, some or all of the actions of the process 400 described as performed by the server system can alternatively be performed by the client device. For example, an application running on the client device can directly detect a pre-search trigger, for example, by receiving user input, receiving information about system events, or by monitoring conditions or properties of the client device. The client device can also receive data indicating that the pre-search trigger occurs from another system. The client device can predict a topic or request a predicted topic from a server system, can generate a confidence score or request a confidence score from a server system, and can determine whether the confidence score satisfies a threshold. The client device can also select a resource corresponding to the topic by instructing a search engine of a server system to perform a search, or by instructing a local search engine to perform a search, for example, a search of a media collection or file system accessible to the client device. The client device can also generate a user interface that includes a representation of the selected resource rather than receiving a representation of a resource.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the techniques described herein or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where a hypertext markup language (HTML) file is mentioned, other file types or formats may be substituted. For instance, an HTML file may be replaced by an extensible markup language (XML), JavaScript object notation (JSON), plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A computer-implemented method comprising:
identifying a plurality of topics that are each classified as being of interest to a particular user, wherein the particular user has a level of interest in each of the topics in the plurality of topics, and the level of interest in each topic varies over time;
determining a confidence score indicating a likelihood that a particular topic of the plurality of topics is of interest to the particular user at a particular time, wherein the particular time is before the particular user has initiated an operation that is a precursor to submitting a search query, the confidence score being indicative of the level of interest of the particular user in the particular topic at the particular time;
at the particular time before the particular user has initiated an operation that is a precursor to submitting a search query, determining that the confidence score indicative of the level of interest of the particular user in the particular topic at the particular time satisfies a threshold;
after determining that the confidence score indicative of the level of interest of the particular user in the particular topic at the particular time satisfies the threshold, determining that the particular user has initiated the operation that is a precursor to submitting a search query; and
in response to (i) determining that the particular user has initiated the operation that is a precursor to submitting a search query and (ii) determining that the confidence score associated with the particular topic satisfies the threshold, and before a search query is submitted, presenting information regarding the particular topic to the particular user.

2. The computer-implemented method of claim 1, wherein determining the confidence score indicating the likelihood that the particular topic is of interest to the particular user at the particular time comprises determining the confidence score associated with the particular topic based on a browsing history of the particular user or a search query history of the particular user.

3. The computer-implemented method of claim 1, wherein determining that the particular user has initiated the operation that is a precursor to submitting a search query comprises detecting a request to provide a web page that provides access to a search interface; and
wherein presenting information regarding the particular topic to the particular user comprises presenting the information to the particular user before the particular user enters a query term using the search interface.

4. The computer-implemented method of claim 1, wherein determining that the particular user has initiated the operation that is a precursor to submitting a search query comprises detecting a request to provide a web page that provides access to a search interface; and
wherein presenting information regarding the particular topic to the particular user comprises causing navigation to be redirected to a web page associated with the particular topic in response to determining that the particular user has initiated the operation that is a precursor to submitting a search query and before receiving user input directing navigation to the web page associated with the particular topic.

5. The computer-implemented method of claim 1, wherein determining the confidence score comprises determining the confidence score based on a time of day or day of the week of the particular time.

6. The computer-implemented method of claim 5, wherein determining the confidence score comprises determining the confidence score based on a degree of correlation between the particular topic and actions of the particular user occurring on previous days within a range of time that includes the time of day of the particular time.

7. The computer-implemented method of claim 1, wherein a predetermined set of actions are designated as precursors to submitting a search query;
wherein determining that the particular user has initiated the operation that is a precursor to submitting a search query comprises:
accessing information that indicates an action of the particular user; and
determining, based on the accessed information, that the action of the particular user is one of the actions in the predetermined set of actions that are designated as precursors to submitting a search query.

8. The computer-implemented method of claim 1, wherein the operation that is a precursor to submitting a search query is an action indicative of an intent to access a search interface or to initiate a search;
wherein determining that the particular user has initiated the operation that is a precursor to submitting a search query comprises:
accessing information that indicates an action of the particular user; and
determining, based on the accessed information, that the action of the particular user is an action indicative of an intent to access a search interface or to initiate a search.

9. A system comprising:
one or more computers and one or more storage devices storing instructions that are operable, when executed by the one or more computers, to cause the one or more computers to perform operations comprising:
identifying a plurality of topics that are each classified as being of interest to a particular user, wherein the particular user has a level of interest in each of the topics in the plurality of topics, and the level of interest in each topic varies over time;
determining a confidence score indicating a likelihood that a particular topic of the plurality of topics is of interest to the particular user at a particular time, wherein the particular time is before the particular user has initiated an operation that is a precursor to submitting a search query, the confidence score being indicative of the level of interest of the particular user in the particular topic at the particular time;
at the particular time before the particular user has initiated an operation that is a precursor to submitting a search query, determining that the confidence score indicative of the level of interest of the particular user in the particular topic at the particular time satisfies a threshold;
after determining that the confidence score indicative of the level of interest of the particular user in the particular topic at the particular time satisfies the threshold, determining that the particular user has initiated the operation that is a precursor to submitting a search query; and
in response to (i) determining that the particular user has initiated the operation that is a precursor to submitting a search query and (ii) determining that the confidence score associated with the particular topic satisfies the threshold, and before a search query is submitted, presenting information regarding the particular topic to the particular user.

10. The system of claim 9, wherein determining the confidence score indicating the likelihood that the particular topic is of interest to the particular user at the particular time comprises determining the confidence score associated with the particular topic based on a browsing history of the particular user or a search query history of the particular user.

11. The system of claim 9, wherein determining that the particular user has initiated the operation that is a precursor to submitting a search query comprises detecting a request to provide a web page that provides access to a search interface; and
wherein presenting information regarding the particular topic to the particular user comprises presenting the information to the particular user before the particular user enters a query term using the search interface.

12. The system of claim 9, wherein determining that the particular user has initiated the operation that is a precursor to submitting a search query comprises detecting a request to provide a web page that provides access to a search interface; and
wherein presenting information regarding the particular topic to the particular user comprises causing navigation to be redirected to a web page associated with the particular topic in response to determining that the particular user has initiated the operation that is a precursor to submitting a search query and before receiving user input directing navigation to the web page associated with the particular topic.

13. The system of claim 9, wherein determining the confidence score comprises determining the confidence score based on a time of day or day of the week of the particular time.

14. The system of claim 13, wherein determining the confidence score comprises determining the confidence score based on a degree of correlation between the particular topic and actions of the particular user occurring on previous days within a range of time that includes the time of day of the particular time.

15. The system of claim 9, wherein a predetermined set of actions are designated as precursors to submitting a search query;
   wherein determining that the particular user has initiated the operation that is a precursor to submitting a search query comprises:
      accessing information that indicates an action of the particular user; and
      determining, based on the accessed information, that the action of the particular user is one of the actions in the predetermined set of actions that are designated as precursors to submitting a search query.

16. The system of claim 9, wherein the operation that is a precursor to submitting a search query is an action indicative of an intent to access a search interface or to initiate a search;
   wherein determining that the particular user has initiated the operation that is a precursor to submitting a search query comprises:
      accessing information that indicates an action of the particular user; and
      determining, based on the accessed information, that the action of the particular user is an action indicative of an intent to access a search interface or to initiate a search.

17. A non-transitory computer-readable storage device encoded with a computer program, the program comprising instructions that when executed by one or more computers cause the one or more computers to perform operations comprising:
   identifying a plurality of topics that are each classified as being of interest to a particular user, wherein the particular user has a level of interest in each of the topics in the plurality of topics, and the level of interest in each topic varies over time;
   determining a confidence score indicating a likelihood that a particular topic of the plurality of topics is of interest to the particular user at a particular time, wherein the particular time is before the particular user has initiated an operation that is a precursor to submitting a search query, the confidence score being indicative of the level of interest of the particular user in the particular topic at the particular time;
   at the particular time before the particular user has initiated an operation that is a precursor to submitting a search query, determining that the confidence score indicative of the level of interest of the particular user in the particular topic at the particular time satisfies a threshold;
   after determining that the confidence score indicative of the level of interest of the particular user in the particular topic at the particular time satisfies the threshold, determining that the particular user has initiated the operation that is a precursor to submitting a search query; and
   in response to (i) determining that the particular user has initiated the operation that is a precursor to submitting a search query and (ii) determining that the confidence score associated with the particular topic satisfies the threshold, and before a search query is submitted, presenting information regarding the particular topic to the particular user.

18. The non-transitory computer-readable storage device of claim 17, wherein determining the confidence score indicating the likelihood that the particular topic is of interest to the particular user at the particular time comprises determining the confidence score associated with the particular topic based on a browsing history of the particular user or a search query history of the particular user.

19. The non-transitory computer-readable storage device of claim 17, wherein determining that the particular user has initiated the operation that is a precursor to submitting a search query comprises detecting a request to provide a web page that provides access to a search interface; and
   wherein presenting information regarding the particular topic to the particular user comprises presenting the information to the particular user before the particular user enters a query term using the search interface.

20. The non-transitory computer-readable storage device of claim 17, wherein determining that the particular user has initiated the operation that is a precursor to submitting a search query comprises detecting a request to provide a web page that provides access to a search interface; and
   wherein presenting information regarding the particular topic to the particular user comprises causing navigation to be redirected to a web page associated with the particular topic in response to determining that the particular user has initiated the operation that is a precursor to submitting a search query and before receiving user input directing navigation to the web page associated with the particular topic.

21. The non-transitory computer-readable storage device of claim 17, wherein determining the confidence score comprises determining the confidence score based on a time of day or day of the week of the particular time.

22. The non-transitory computer-readable storage device of claim 21, wherein determining the confidence score comprises determining the confidence score based on a degree of correlation between the particular topic and actions of the particular user occurring on previous days within a range of time that includes the time of day of the particular time.

23. The non-transitory computer-readable storage device of claim 17, wherein a predetermined set of actions are designated as precursors to submitting a search query;
   wherein determining that the particular user has initiated the operation that is a precursor to submitting a search query comprises:
      accessing information that indicates an action of the particular user; and
      determining, based on the accessed information, that the action of the particular user is one of the actions in the predetermined set of actions that are designated as precursors to submitting a search query.

24. The non-transitory computer-readable storage device of claim 17, wherein the operation that is a precursor to submitting a search query is an action indicative of an intent to access a search interface or to initiate a search;
   wherein determining that the particular user has initiated the operation that is a precursor to submitting a search query comprises:
      accessing information that indicates an action of the particular user; and
      determining, based on the accessed information, that the action of the particular user is an action indicative of an intent to a search.

25. A computer-implemented method comprising:
   identifying a plurality of topics that are each classified as being of interest to a particular user, wherein the particular user has a level of interest in each of the topics in the plurality of topics, and the level of interest in each topic varies over time;
   determining a confidence score indicating a likelihood that a particular topic of the plurality of topics is of interest to the particular user at a particular time, wherein the particular time is before the particular user has initiated an operation that is a precursor to submitting a search query, the confidence score being indicative of the level of interest of the particular user in the particular topic at the particular time;

before the particular user has initiated an operation that is a precursor to submitting a search query, determining that the confidence score indicative of the level of interest of the particular user in the particular topic at the particular time satisfies a threshold;

after determining that the confidence score indicative of the level of interest of the particular user in the particular topic at the particular time satisfies the threshold, determining that the particular user has initiated the operation that is a precursor to submitting a search query within a predetermined range of time from the particular time; and in response to (i) determining that the particular user has initiated the operation that is a precursor to submitting a search query within the predetermined range of time from the particular time and (ii) determining that the confidence score associated with the particular topic satisfies the threshold, and before a search query is submitted by the particular user following the initiation of the operation, presenting information regarding the particular topic to the particular user.

* * * * *